United States Patent [19]
Mokadam et al.

[11] Patent Number: 5,543,387
[45] Date of Patent: Aug. 6, 1996

[54] SURFACTANT ADDITIVE FOR OILFIELD ACIDIZING

[75] Inventors: Anita R. Mokadam; Charles E. Strubelt; Dennis A. Williams; Kenneth M. Webber, all of Houston, Tex.

[73] Assignees: Nalco/Exxon Energy Chemicals, L.P, Sugarland; Exxon Production Research Co., Houston, both of Tex.

[21] Appl. No.: 387,592

[22] Filed: Feb. 13, 1995

[51] Int. Cl.$^6$ .......... E21B 43/22; C07C 149/30; C07C 143/46
[52] U.S. Cl. .......... 507/135; 562/74; 507/200; 507/255; 507/923; 507/933; 166/252.3
[58] Field of Search .......... 507/200, 135, 507/255; 562/74

[56] References Cited

U.S. PATENT DOCUMENTS

| | | | |
|---|---|---|---|
| 2,828,334 | 3/1958 | Groote | 260/512 |
| 4,018,278 | 4/1977 | Shupe | 166/252 |
| 4,073,344 | 2/1978 | Hall | 166/307 |
| 4,574,050 | 3/1986 | Crowe et al. | 252/8.55 |
| 4,823,874 | 4/1989 | Ford | 166/279 |
| 4,959,490 | 9/1990 | Livermore et al. | 562/74 |

FOREIGN PATENT DOCUMENTS 88301421  3/1988  European Pat. Off. ...... C07C 143/46

OTHER PUBLICATIONS

SPE Paper No. 25185; Ashpaltene Stabilization in Alkyl Solvents Using Oil Soluble Amphiphiles; Chang et al, 1993.
Acidizing Fundamentals, Williams et al, pp. 95 and 96 (1979).

*Primary Examiner*—David B. Springer
*Attorney, Agent, or Firm*—R. L. Graham

[57] ABSTRACT

Subterranean oil-bearing formations are treated with aqueous acid solutions which include an effective amount of an alkoxylated alkyl substituted phenol sulfonate which exhibits both antisludge and demulsification properties.

17 Claims, No Drawings

SURFACTANT ADDITIVE FOR OILFIELD ACIDIZING

BACKGROUND OF THE INVENTION

This invention relates generally to the use of surface active agents (surfactants) in oil field acidizing operations to reduce emulsion and sludge formation in such operations. In one aspect, the invention relates to a method of acidizing subterranean formations using alkoxylated alkyl substituted phenol sulfonates.

Acidizing is a well treatment operation wherein an acid solution is injected into a subterranean formation to dissolve formation minerals and foreign material and thereby improve the productivity of the formation. The acidizing treatment may be by matrix acidizing or acid fracturing. A problem associated with these treatments is the tendency of the acid or reaction products to form sludge which can reduce the effectiveness of the treatment or plug the formation or production equipment. "Sludge" is a generic term used in the industry that encompasses insoluble components that precipitate out of the crude oil upon contact with the acid solution. These insoluble components include asphaltene, resins, paraffins and other high molecular weight hydrocarbon. Precipitation of these materials is aggravated by the presence of ferric compounds or $Fe^{3+}$ ions that enter the acid solution through corrosion.

Another problem associated with oil field acidization is the formation of emulsions resulting from reacted acid contacting formation crude oil. These emulsions, particularly those stabilized by fines, exhibit high viscosity and can impede the flow of formation liquids to the wellbore.

Efforts to counteract sludge and emulsion formation have involved the use of antisludge agents and/or demulsifiers in the acid solution.

Typical antisludge agents are as follows:

(a) amphiphile compounds (alkyl benzyl derivatives) disclosed in SPE Paper No. 25185, "Asphaltene Stabilization in Alkyl Solvents Using Oil-Soluble Amphiphiles";

(b) ethoxylated alkyl phenol disclosed in U.S. Pat. No. 4,823,874; and (c) dodecylbenzene sulfonate disclosed in U.S. Pat. No. 4,073,344.

A wide variety of surface active agents (surfactants) have been used in acid treatment as demulsifiers. The text book *Acidizing Fundamentals*, by B. B. Williams, J. L. Gidley, and R. R. Schechter, on pages 95 and 96, discloses the use of surfactants as demulsifying agents. The surfactants indicated are organic amines and salts of quaternary amines and polyoxyethylated alkyl phenols. The same publication also discloses the use of antisludge agents in acidizing, particularly for treatment in fields containing heavy asphaltic oils. The suggested surfactants for alleviating this problem are alkyl phenols and fatty acids. U.S. Pat. No. 4,073,344 also suggests the use of ethoxylated nonylphenol as a surfactant in acidizing operations. U.S. Pat. Nos. 4,018,278 and 2,828,334 disclose the use of surfactants such as alkylpyridinium, alkylsulfates, alkylaryl-sulfates, ethoxylated alkylarylsulfates, alkyl sulfonates, alkyl sulfonates and alkylaryl sulfonates in well treatments.

As indicated above, the present invention relates to the use of alkoxylated alkyl substituted phenol sulfonates. U.S. Pat. No. 4,959,490 discloses a process for manufacturing certain of the sulphonates—monosulfonated alkyl phenol polyalkylene oxide sulfonates (disulfonates)—and European Patent Application No. 88301421.9 discloses a process for manufacturing and uses of other of such substituted sulfonates. Neither of these references discloses the use of these compounds in acidizing of subterranean formations.

The emulsions and sludges formed in acidizing operations not only reduce the effectiveness of the acid treatment, but can plug the formation and production equipment.

Because of their different functionality, separate antisludge agents and demulsifiers are frequently used in treating acid solutions. A surfactant which provides for both antisludge and demulsification would not only simplify the treatment, but would also improve the acidizing operation. Also, a surfactant possessing such bifunctional properties (e.g. antisludge and demulsification) could reduce the amount of additives required in the treatment.

SUMMARY OF THE INVENTION

The method of the present invention involves the acid stimulation of subterranean oil bearing formations wherein an acid solution is injected through a wellbore and into the formation. In accordance with the present invention, the acid solution contains an effective amount of a surfactant having the formula of

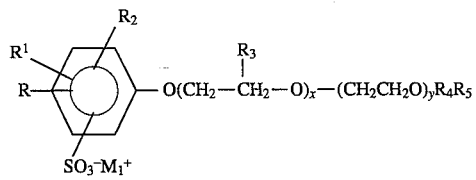

where

R is a linear or branched alkyl group having from 3 to 40 carbon atoms, preferably from 4 to 30 carbon atoms, most preferably 6 to 20 carbon atoms;

$R_1$, $R_2$, and $R_3$ are independently H or $C_{1-3}$ alkyl groups;

$R_4$ is a branched or linear $C_{2-4}$ alkyl group;

$R_5$ is $-SO_3^-M_2^+$ or $-OH$;

x ranges from 0 to 10;

y ranges from 0 to 50;

$M_1^+$ and $M_2^+$ are independently a cation selected from H, ammonia, amines, ethanolamines, and a metal mono or di cation.

The concentration of the surfactant in the acid solution is sufficient to reduce sludge formation. Surprisingly, it has been discovered that the surfactant also exhibits demulsification properties.

DESCRIPTION OF THE PREFERRED EMBODIMENTS

In accordance with the present invention, acids used in the treatment of subterranean formations contains an alkoxylated alkyl substituted phenol sulfonate. For convenience, this surfactant is frequently referred to herein as "AAPS" surfactant.

The method of the present invention will be described with reference to (A) the Acid System, (B) the description of the AAPS Surfactant and formulation, (C) Method of Preparation, (D) Acidizing Operations, and (E) Experiments.

A. Acid Systems

As mentioned above, the method and formulation of the present invention employs a bifunctional surfactant in the acid system used in the acidizing of subterranean formations. Any of the known oil field acids may be used. These are referred to herein as "well treating acids" and include aqueous solutions of inorganic acids such as hydrochloric acid (HCl), hydrofluoric acid (HF), mixtures of HCl and HF (i.e. mud acid), and organic acids such as acetic acid, formic acid, and anhydrides. The most common acids are 3% HCl, 7½% HCl, 15% HCl, 28% HCl, and blends of HCl and HF (mud acid). Mud acid is normally a blend of 6 to 12% of HCl and 1½ to 6% HF.

B. AAPS Surfactant

The AAPS surfactant used in the method of the present invention has the following formula (I):

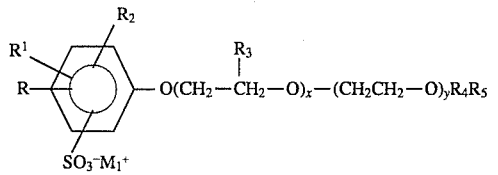
(I)

where

R is a linear or branched alkyl group having from 3 to 40 carbon atoms, preferably from 4 to 30 carbon atoms, most preferably 6 to 20 carbon atoms;

$R_1$, $R_2$, and $R_3$ are independently H or $C_{1-3}$ alkyl groups;

$R_4$ is a branched or linear $C_{2-4}$ group;

$R_5$ is $-SO_3^-M_2^+$ or $-OH$;

x ranges from 0 to 10;

y ranges from 0 to 50;

$M_1^+$ and $M_2^+$ may be the same or different and are independently a cation selected from H, ammonia, amines, ethanolamines, and a metal mono or di cation.

The variables in Formula I include the alkyl tail, the alkoxy group, and the cation.

Preferred alkyl groups are branched alkyl groups including nonyl, dodecyl, and tridecyl alkyl groups. The preferred alkoxy group is ethylene oxide or propylene oxide with the former being the most preferred. The preferred cation is selected from the alkaline metals such as sodium. The ranges of the R and alkoxy groups are as follows:

|  | Range | Preferred Range | Most Preferred Range |
|---|---|---|---|
| Alkyl tail (R) | $C_3-C_{40}$ | $C_4-C_{30}$ | $C_6-C_{20}$ |
| Alkoxy Groups | 1–60 | | |
| EO | 0–50 | 2–20 | 3–15 |
| PO | 0–10 | | |

In a preferred embodiment, the AAPS surfactant is a mono-sulfonated alkyl phenol polyethyleneoxide sulfonate (disulfonate) having the following Formula (II):

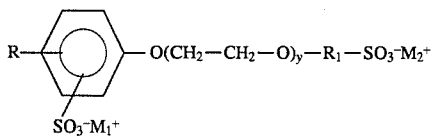
(II)

where

R is a linear or branched alkyl group having from 4 to 30 carbon atoms;

$R_1$ is a branched or linear $C_{2-4}$ alkyl group;

y ranges from 0 to 20;

$M_1^+$ and $M_2^+$ are defined in Formula I and are preferably the same, and most preferably metal mono cations such as Na, Li, K.

In another preferred embodiment, the surfactant is an alkoxylated substituted phenol sulfonate having the following Formula (III):

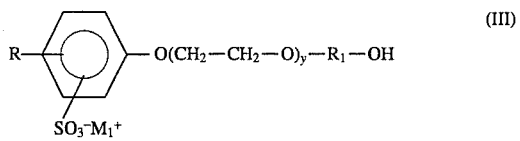
(III)

where

R is a linear or branched alkyl group having from 4 to 30 carbon atoms;

$R_1$ is a branched or linear $C_{2-4}$ alkyl group;

y ranges from 0 to 20;

$M_1^+$ is a cation as defined in Formula II.

Representative specific AAPS surfactants useful in the method of the present invention are listed below.

| Disulfonates (Formula II): | | | |
|---|---|---|---|
| R | EO Group | $M_1^+$ and $M_2^+$ | Sodium Salts |
| $iC_{12}$ | 10 | Na | Dodecyl phenol polyethylene oxide disulfonate |
| $iC_9$ | 3 | Na | Nonylphenol polyethylene oxide disulfonate |
| $1C_6$ | 4.4 | Na | Hexylphenol- polyethylene oxide disulfonate |
| $iC_9$ | 10 | Na | Nonylphenol- polyethylene oxide disulfonate |

| Substituted phenol Sulfonate (Formula III): | | | |
|---|---|---|---|
| R | EO Group | $M^+$ | Sodium Salts |
| $iC_{12}$ | 10 | Na | Dodecylphenol- poly (ethylene oxy) ethanol sulfonate |
| $1C_{16}$ | 5 | Na | Hexadecyl phenol poly (ethylene oxy) ethanol sulfonate |

C. Method of Preparation

The disulfonate useful in the method of the present invention may be prepared by the method described in U.S. Pat. No. 4,957,490, the disclosure of which is incorporated herein by reference.

The preparation procedure may be as follows:

(a) reacting an alkylphenol with alkylene oxide in an oxyalkylation reaction to produce an oxyalkylated alkylphenol including an oxyalkylate chain;

(b) reacting said oxyalkylated alkylphenol with a sulfonating reagent to produce a sulfonic/sulfate acid dianion having a sulfate group attached at the terminus of the said oxyalkylate chain and a sulfonate group attached to the phenol ring;

(c) reacting said sulfonic/sulfate acid dianion with a neutralizing agent to produce a dianion salt having a neutralized sulfate and a neutralized sulfonate group; and (d) reacting said dianion salt with an agent capable of displacing said sulfate group with a sulfonate group to produce said monosulfonated alkylphenol polyalkylene oxide sulfonate; and (e) extracting said monosulfonated alkylphenol polyalkylene oxide sulfonate with a low molecular weight oxygenated organic solvent.

The mole ratio and reaction temperatures of the above steps are described in U.S. Pat. No. 4,959,490.

The substituted phenol sulfonates may be prepared as follows:

(a) reacting an alkylphenol with a sulfonating agent to produce an alkylphenol sulfonic acid with the sulfonate group attached to the phenol ring;

(b) reacting said alkylphenol sulfonic acid with a neutralizing agent to produce a neutralized sulfonate group;

(c) adding a solvent and additional neutralizing agent to the alkylphenol sulfonate to form a fluid solution;

(d) distilling said solution to remove any water and to cause the excess neutralizing agent to react with the hydroxide group of the phenol ring to form an alkylphenoxide sulfonate;

(e) reacting said alkylphenoxide sulfonate with an alkylene oxide in an oxyalkylation reaction to produce an oxy-alkylated alkylphenol sulfonate.

D. Operation

The method of the present invention may be carried out by preparing a formulation for introducing into the acid at the well site. The formulation preferably has the following composition:

|  | Wt % | | |
|---|---|---|---|
|  | Range | Preferred | Most Preferred |
| AAPS Surfactant | 3–60 | 15–50 | 30–50 |
| Nonionic Surfactant (HLB of 9.5 and above, preferably HLB of 10–18 to impart water wettability to formation materials) | 3–60 | 15–50 | 30–50 |
| Water with 0 to 50 vol % alcohol (e.g. IPA), preferably 10 to 40 vol % alcohol (e.g. IPA) | Balance | Balance | Balance |

Optionally, a water soluble or water dispersible corrosion inhibitor can be used in the formulation at a concentration ranging from 0.1 vol % to 5.0 vol % preferably 0.1 to 2.0 vol %.

The actives of the AAPS Surfactant in the formulation may vary within a wide range depending on several factors, but concentrations of 15 to 50 wt. % will be sufficient for most applications.

The concentration of the AAPS Surfactant in the aqueous acid will depend on several factors, including asphaltene content of the crude oil, the tendency of the crude oil and acid to emulsify, temperature, the presence of other additives which may impart synergy to the package. Experimental tests using the selected acid and sample of the crude can be carried out to determine effective treatment rates of the AAPS. Typically, however, the concentration in the acid solution will be in the range from 10 to 2000 ppm in the acid, preferably 50 to 500 ppm, most preferably 100 to 400 ppm.

In designing the treatment, overtreatment with the AAPS Surfactant should be avoided because it can cause the system to form a stable emulsion between the treating liquid and formation fluids.

E. Experiments

Commercial antisludge formulations were used in the experiments:

Comparative Samples (herein referred to as DDBSA Sample):

a commercial water base antisludge formulation comprising about 40 wt % dodecylbenzene sulfonic acid (DDBSA) and including a nonionic surfactant, alcohol, and a dispersant.

Formulations containing the AAPS surfactant used in the experiments were as follows:

|  | Formulation (gms) | | |
|---|---|---|---|
| Starting materials | A | B | C |
| ethoxylated nonionic surfactant (12 HLB) | 18.00 | 18.00 | 18.00 |
| alcohol (IPA) | 3.50 | 3.50 | 3.50 |
| water | 9.25 | 9.25 | 9.25 |
| AAPS Surfactant: A | 19.55 | — | — |
| B | — | 19.23 | — |
| C | — | — | 19.23 |

Surfactant A (Formula II) was a sodium disulfonate having 10 EO groups and a branched $C_{12}$ alkyl group, prepared by the procedures described in U.S. Pat. No. 4,959,490.

Surfactant B (Formula III) was a sodium sulfonate salt and had 10 EO groups and a branched $C_{12}$ alkyl group, prepared by the procedures described earlier in this Patent Application.

Surfactant C (Formula II) was a sodium disulfonate having 10 EO groups and a branched nonyl group, prepared by the procedures described in U.S. Pat. No. 4,959,490.

Test Procedure

An HCl solution (15% HCl) was mixed with an equal volume percent of a crude oil (containing a trace of water) and a surfactant formulation (DDBSA or AAPS). The total volume of each sample was 100 ml. The sample was sheared for 30 seconds at 75° F. to intermix the HCl solution and the crude oil. The mixture was immediately poured into a 100 ml cylinder and observed for the volume of water separation incrementally over a 30 minute time period. The amount of free water (acid) was recorded at selected time intervals. After ten minutes, the samples were placed in a water bath (112° F.) and the separation tests continued. After completion of the separation tests, each sample was inverted three times to mix the layers and was poured through a 100 mesh screen and the extent of screen plugging was measured as a percentage of the screen openings plugged.

The results using the commercial Antisludge Agent are shown in TABLE I wherein the DDBSA surfactant is referred to as "Comp." to indicate comparative results.

TABLE I

| Test No. | Surfactant formulation | ml. | | 2 | 6 | 10 | 15 | 30 | Sludge |
|---|---|---|---|---|---|---|---|---|---|
| Blank | 0 | 0 | Free Water (%) | 0 | 0 | 0 | 0 | 0 | 100% |
| | | | Emulsion (%) | 100 | 100 | 100 | 100 | 100 | |
| 1 Comp. | DDBSA | 0.15 | Free Water (%) | 0 | — | 4 | 8 | 80 | 0 |
| | | | Emulsion (%) | 100 | — | 96 | 92 | 20 | |
| 2 Comp. | DDBSA | 0.25 | Free Water (%) | 4 | 10 | 12 | 18 | 66 | 0 |
| | | | Emulsion (%) | 96 | 90 | 88 | 82 | 34 | |
| 3 Comp. | DDBSA | 0.50 | Free Water (%) | 14 | 30 | 42 | 84 | 100 | 0 |
| | | | Emulsion (%) | 86 | 70 | 58 | 16 | 0 | |

The above tests demonstrate that the commercial surfactant was effective in eliminating sludge, but was not effective in demulsification, except at the highest treating rate (0.50 ml).

The same tests were carried out using Surfactant Formulations A, B, and C. The test results are shown in TABLE II.

TABLE II

| Test No. | Surfactant Formulation Type | ml. | | 2 | 4 | 6 | 8 | 10 | 15 | 30 | Sludge |
|---|---|---|---|---|---|---|---|---|---|---|---|
| 1A | A | 0.500 | Free Water (%) | 0 | 0 | 0 | 0 | 0 | 2 | 2 | 0-tr. |
| | | | Emulsion (%) | 100 | 100 | 100 | 100 | 100 | 98 | 98 | |
| 2A | A | 0.250 | Free Water (%) | 2 | 3 | 4 | 4 | 4 | 8 | 8 | 0 |
| | | | Emulsion (%) | 98 | 97 | 96 | 96 | 96 | 92 | 92 | |
| 3A | A | 0.050 | Free Water (%) | 2 | 10 | 16 | 20 | 26 | 42 | 90 | 0-tr. |
| | | | Emulsion (%) | 98 | 90 | 84 | 80 | 74 | 58 | 10 | |
| 4A | A | 0.030 | Free Water (%) | 10 | 24 | 44 | 60 | 70 | 100 | 100 | 0-tr. |
| | | | Emulsion (%) | 90 | 76 | 56 | 40 | 30 | 0 | 0 | |
| 1B | B | 0.500 | Free Water (%) | 0 | 0 | 0 | 0 | 0 | 2 | 2 | 0-tr. |
| | | | Emulsion (%) | 100 | 100 | 100 | 100 | 100 | 98 | 98 | |
| 2B | B | 0.150 | Free Water (%) | 0 | 0 | 1 | 2 | 3 | 8 | 18 | 0 |
| | | | Emulsion (%) | 100 | 100 | 99 | 98 | 97 | 92 | 82 | |
| 3B | B | 0.100 | Free Water (%) | 2 | 6 | 12 | 14 | 20 | 48 | 80 | 0 |
| | | | Emulsion (%) | 98 | 94 | 88 | 86 | 80 | 52 | 20 | |
| 4B | B | 0.075 | Free Water (%) | 8 | 22 | — | 64 | 84 | 60 | 100 | 0 |
| | | | Emulsion (%) | 92 | 78 | — | 36 | 16 | 40* | 0 | |
| 5B | B | 0.050 | Free Water (%) | 18 | 50 | 80 | 84 | 86 | 90 | 96 | 0 |
| | | | Emulsion (%) | 82 | 50 | 20 | 16 | 14 | 10 | 4 | |
| 6B | B | 0.040 | Free Water (%) | 2 | 4 | 4 | 4 | 4 | 10 | 10 | 0 |
| | | | Emulsion (%) | 98 | 96 | 96 | 96 | 96 | 90 | 90 | |
| 7B | B | 0.030 | Free Water (%) | 4 | 6 | 6 | 6 | 6 | 10 | 10 | 0 |
| | | | Emulsion (%) | 96 | 94 | 94 | 94 | 94 | 94 | 90 | |
| 1C | C | 0.500 | Free Water (%) | 0 | 0 | 0 | 0 | 0 | 0 | 0 | 0 |
| | | | Emulsion (%) | 100 | 100 | 100 | 100 | 100 | 100 | 100 | |
| 2C | C | 0.050 | Free Water (%) | 2 | 4 | 6 | 6 | 6 | 10 | 10 | 0 |
| | | | Emulsion (%) | 98 | 96 | 94 | 94 | 94 | 90 | 90 | |
| 3C | C | 0.030 | Free Water (%) | 1 | 4 | 6 | 6 | 6 | 18 | 28 | 0 |
| | | | Emulsion (%) | 99 | 96 | 94 | 94 | 94 | 82 | 72 | |

*two distinct water layers formed with a lighter brown bottom-most layer (60%) and above a darker layer (40%), both opaque.

The Table II data demonstrate that Surfactant Formulations A, B, and C at all concentrations were effective in eliminating sludge and were more effective than the commercial DDBSA surfactant (Table I data) in eliminating emulsions. Surfactant A gave the best results in eliminating emulsions.

In order to eliminate the effects of viscosity of the samples, additional tests were carried out using a diluted Surfactant A (10 vol. % of Surfactant A Formulation in water), denoted as Surfactant Ad Formulation. The test results are presented in Table III.

TABLE III

| Test No. | Surfactant Formulation Type | Vol. % (Active)[1] | | 2 | 6 | 10 | 30 | Sludge |
|---|---|---|---|---|---|---|---|---|
| 1 Ad | Ad | 0.500 | Free Water (%) | 4 | 12 | 20 | 86 | 2% |
| | | | Emulsion (%) | 96 | 88 | 80 | 14 | |

TABLE III-continued

| Test No. | Surfactant Formulation Type | Vol. % (Active)[1] | | Time (min.) 2 | 6 | 10 | 30 | Sludge |
|---|---|---|---|---|---|---|---|---|
| 2 Ad | Ad | 0.300 | Free Water (%) | 12 | 40 | 70 | 100 | 1% |
|  |  |  | Emulsion (%) | 88 | 60 | 30 | 0 |  |
| 3 Ad | Ad | 0.150 | Free Water (%) | 0 | Tr. | 2 | 42 | 0 |
|  |  |  | Emulsion (%) | 100 | 100 | 98 | 58 |  |

[1] AAPS actives-Vol. % in Formulation

The Table III results demonstrate that the diluted Surfactant A was effective in eliminating sludge and in addition exhibited demulsification properties. Note the concentration of the Surfactant A in the acid solution was 0.04, 0.025, and 0.012 wt. % for Test Nos. 1 Ad, 2 Ad, and 3 Ad, respectively.

Additional tests were carried out using Surfactant Ad and a demulsifier. The sample used was a mixture of Formulation Ad and a 10 vol. % of a commercial nonionic non-emulsifier (Tekstim 8547, marketed by NALCO/EXXON ENERGY CHEMICALS, L.P.) in alcohol (IPA). The non-emulsifier is identified as N-E in the data. The test results are shown in Table IV.

TABLE IV

| Test No. | Formulation Type | ml | | Time (min.) 2 | 6 | 10 | 30 | Sludge |
|---|---|---|---|---|---|---|---|---|
| 1 Ad/N-E | Ad/N-E | 0.15/0.50 | Free Water (%) | tr. | 6 | 14 | 98 | 1% |
|  |  |  | Emulsion (%) | 100 | 94 | 86 | 2 |  |
| 2 Ad/N-E | Ad/N-E | 0.15/0.75 | Free Water (%) | 10 | 60 | 90 | 100 | Tr. |
|  |  |  | Emulsion (%) | 90 | 40 | 10 | 0 |  |
| 3 Ad/N-E | Ad/N-E | 0.20/0.70 | Free Water (%) | 4 | 26 | 58 | 100 | Tr. |
|  |  |  | Emulsion (%) | 96 | 74 | 42 | 0 | 0 |

The Table IV data demonstrate the effectiveness of the combination of Surfactant A and a commercial non-emulsifier in eliminating sludge and emulsions at low treating rates: Surfactant A at about 0.01 wt. % in the acid solution, and non-emulsifier N-E at about 0.14 wt. % in the acid solution.

In order to determine the effectiveness of the surfactant in acid containing reduced iron ($Fe^{2+}$), Surfactant Ad and the commercial non-emulsifier (N-E) were used in the tests. The data are presented in Table V.

TABLE V

| Test No. | Surfactant Type | ml | | Time (min.) 10 | 15 | 30 | 38 | Sludge |
|---|---|---|---|---|---|---|---|---|
| 1 Ad/N-E | Ad/N-E | 0.20/0.70 | Free Water (%) | 0 | 0 | 0 | 0 | 0 |
|  |  |  | Emulsion (%) | 100 | 100 | 100 | 0 |  |
| 2 Ad/N-E | Ad/N-E | 0.20/1.0 | Free Water (%) | 0 | 1 | 36 | 94 | 0 |
|  |  |  | Emulsion (%) | 100 | 99 | 64 | 6 |  |

The Table V data demonstrate that the Surfactant Ad with the commercial non-emulsifier was effective at very low treating rates in eliminating sludge and preventing emulsification.

The test data reveal that the AAPS in many applications can be used alone in the acid and effectively eliminate sludging and emulsification. In other applications, the AAPS surfactant supplemented with a relatively small amount of a non-emulsifier can produce an economic combination for preventing or reducing sludge and emulsions in oil field acidizing.

What is claimed is:

1. In a method of acidizing a subterranean oil-bearing formation wherein an aqueous acid solution is injected into the formation, the improvement wherein the aqueous acid solution contains an effective amount of a surfactant to reduce sludge or emulsion formation resulting from the acid solution contacting formation oil, said surfactant having the following formula:

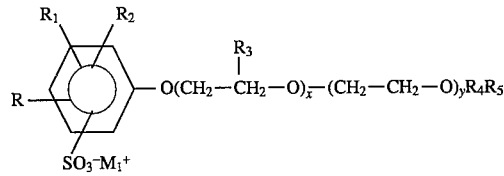

where

R is a linear or branched alkyl group having from 3 to 40 carbon atoms;

$R_1$, $R_2$, and $R_3$ are independently H or $C_{1-3}$ alkyl groups;

$R_4$ is a branched or linear $C_{2-4}$ alkyl group;

$R_5$ is $-SO_3^-M_2^+$ or $-OH$;

x ranges from 0 to 10;

y ranges from 0 to 50;

$M_1^+$ and $M_2^+$ are independently a cation selected from ammonia, amines, ethanolamines, and a metal mono or di cation.

2. The method of claim 1 wherein R has from 4 to 30 carbon atoms; $R_1$ and $R_2$ are independently H; and $R_5$ is $SO_3^-M_2^+$.

3. The method of claim 2 wherein $R_3$ is H and $R_4$ is $CH_2CH_2$.

4. The method of claim 1 wherein R has from 4 to 30 carbon atoms; $R_1$ and $R_2$ are independently H; and $R_5$ is OH.

5. The method of claim 4 wherein $R_3$ is H and $R_4$ is $CH_2CH_2$.

6. The method of claim 1 wherein the concentration of the surfactant in the acid solution ranges from 10 to 2000 ppm.

7. The method of claim 1 wherein the acid solution is a mineral acid selected from the group consisting of HCl, HF, and mixtures thereof.

8. The method of claim 1 wherein the acid solution further includes a nonionic non-emulsifying agent.

9. The method of claim 1 wherein the acid solution has a pH of less than 3.5.

10. The method of claim 1 wherein the surfactant is soluble in the acid solution.

11. The method of claim 1 wherein $M_1^+$ and $M_2^+$ are each Na.

12. In a method of acidizing a subterranean oil-bearing formation wherein an aqueous acid solution is injected into the formation, the improvement wherein the aqueous acid solution has dissolved therein an effective amount of a surfactant to reduce sludge or emulsion formation resulting from the acid solution contacting formation oil, said surfactant having the following formula:

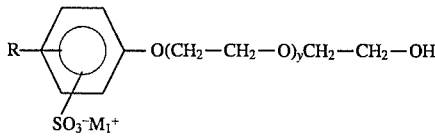

where

R is a linear or branched alkyl group having from 4 to 30 carbon atoms;

y ranges from 0 to 20;

$M_1^+$ is independently a cation selected from H ammonia, amines, ethanolamines, and a metal mono or di cation.

13. In a method of acidizing a subterranean oil-bearing formation wherein an aqueous acid solution is injected into the formation, the improvement wherein the aqueous acid solution has dissolved therein an effective amount of a surfactant to reduce sludge or emulsion formation resulting from the acid solution contacting formation oil, said surfactant having the following formula:

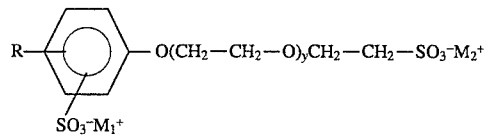

where

R is a linear or branched alkyl group having from 4 to 30 carbon atoms;

y ranges from 0 to 20;

$M_1^+$ and $M_2^+$ are independently a cation selected from ammonia, amines, ethanolamines, and a metal mono or di cation.

14. An oil well treating liquid for use in the acidizing of subterranean formations which comprises:

(a) an aqueous acid solution;

(b) from 10 to 2000 ppm of a surfactant having the following formula:

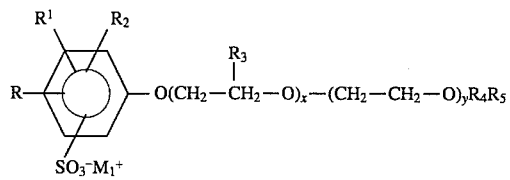

where

R is a linear or branched alkyl group having from 3 to 40 carbon atoms;

$R_1$, $R_2$, and $R_3$ are independently H or $C_{1-3}$ alkyl groups;

$R_4$ is a branched or linear $C_{2-4}$ alkyl group;

$R_5$ is $-SO_3^-M_2^+$ or $-OH$;

x ranges from 0 to 10;

y ranges from 0 to 50;

$M_1^+$ and $M_2^+$ are independently a cation selected from ammonia, amines, ethanolamines, and a metal mono or di cation.

15. The treating liquid of claim 14 and further comprising from 200 to 2000 ppm of a nonionic surfactant having an HLB of 9.5 and above.

16. The treating liquid of claim 14 and further comprising from 0.05 to 2 wt. % of a water soluble or water dispersible non-emulsifying agent.

17. The treating liquid of claim 14 wherein the water soluble or water dispersible non-emulsifying agent is a nonionic surfactant capable of breaking, or inhibiting the formation, of water and oil emulsions caused by the mixing of the aqueous acid solution and oil.

* * * * *